W. V. TURNER.
LOAD BRAKE APPARATUS.
APPLICATION FILED AUG. 27, 1910.
1,053,246.
Patented Feb. 18, 1913.
4 SHEETS—SHEET 1.
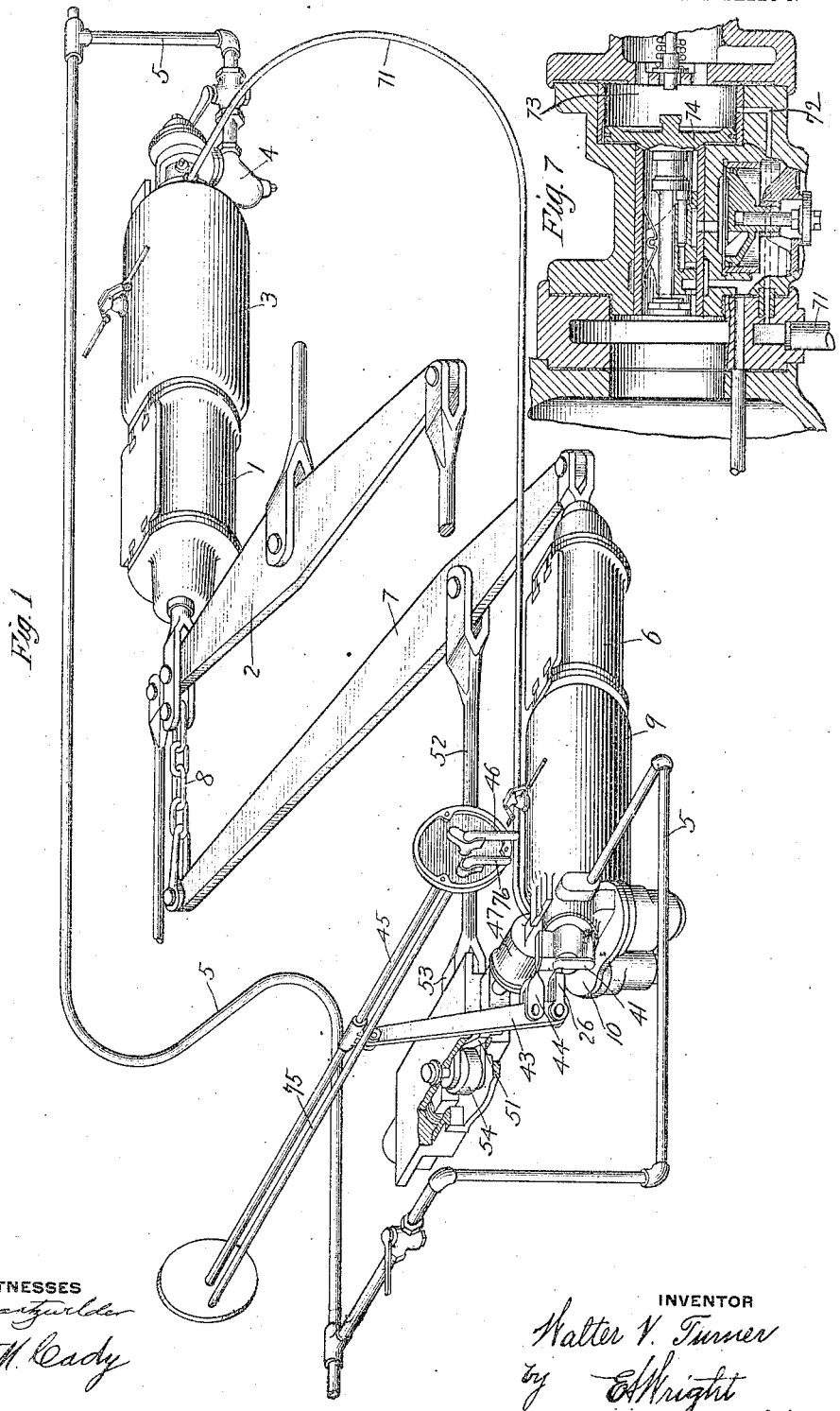
WITNESSES
INVENTOR
Walter V. Turner
by E. Wright
Att'y.

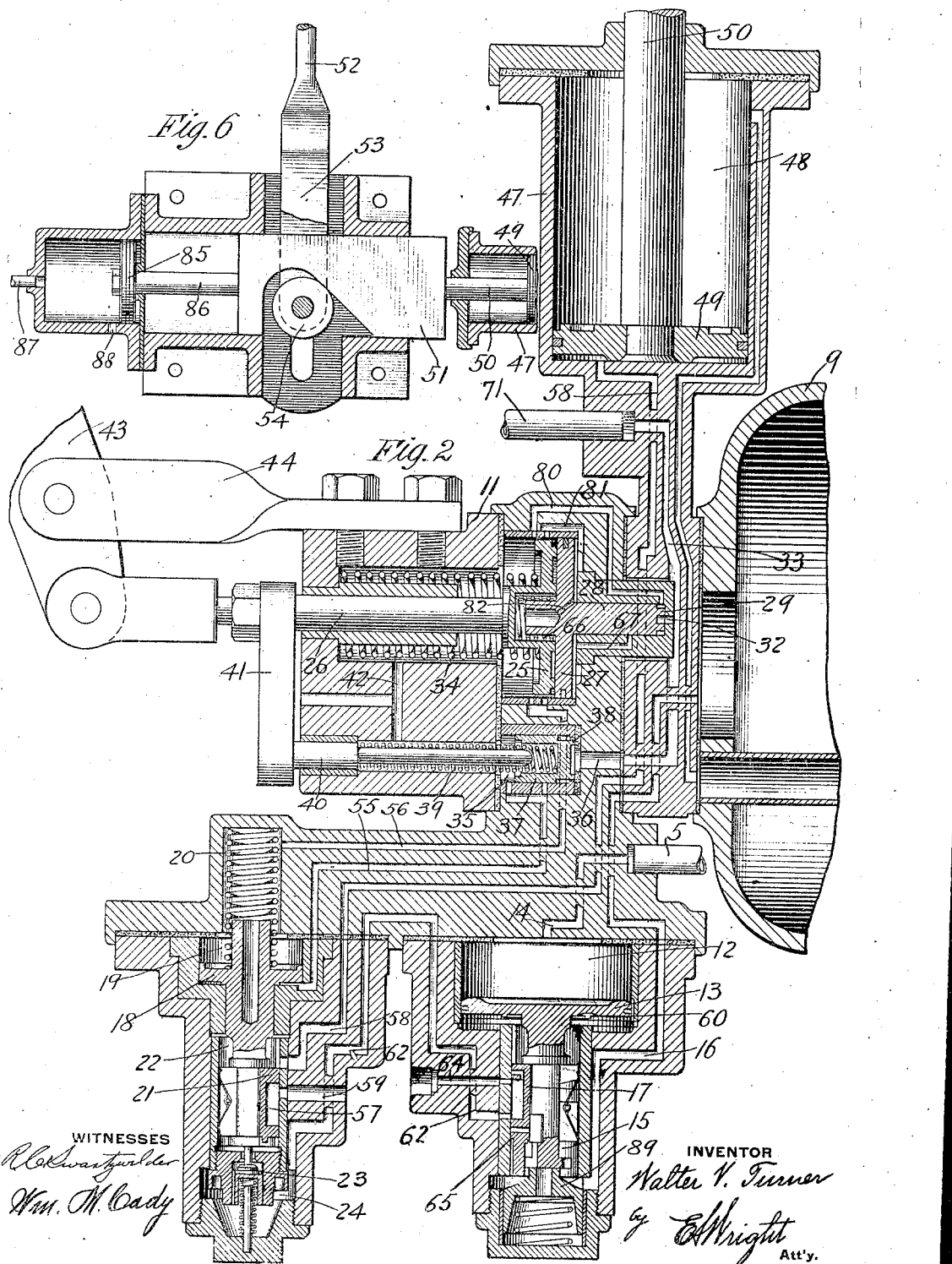

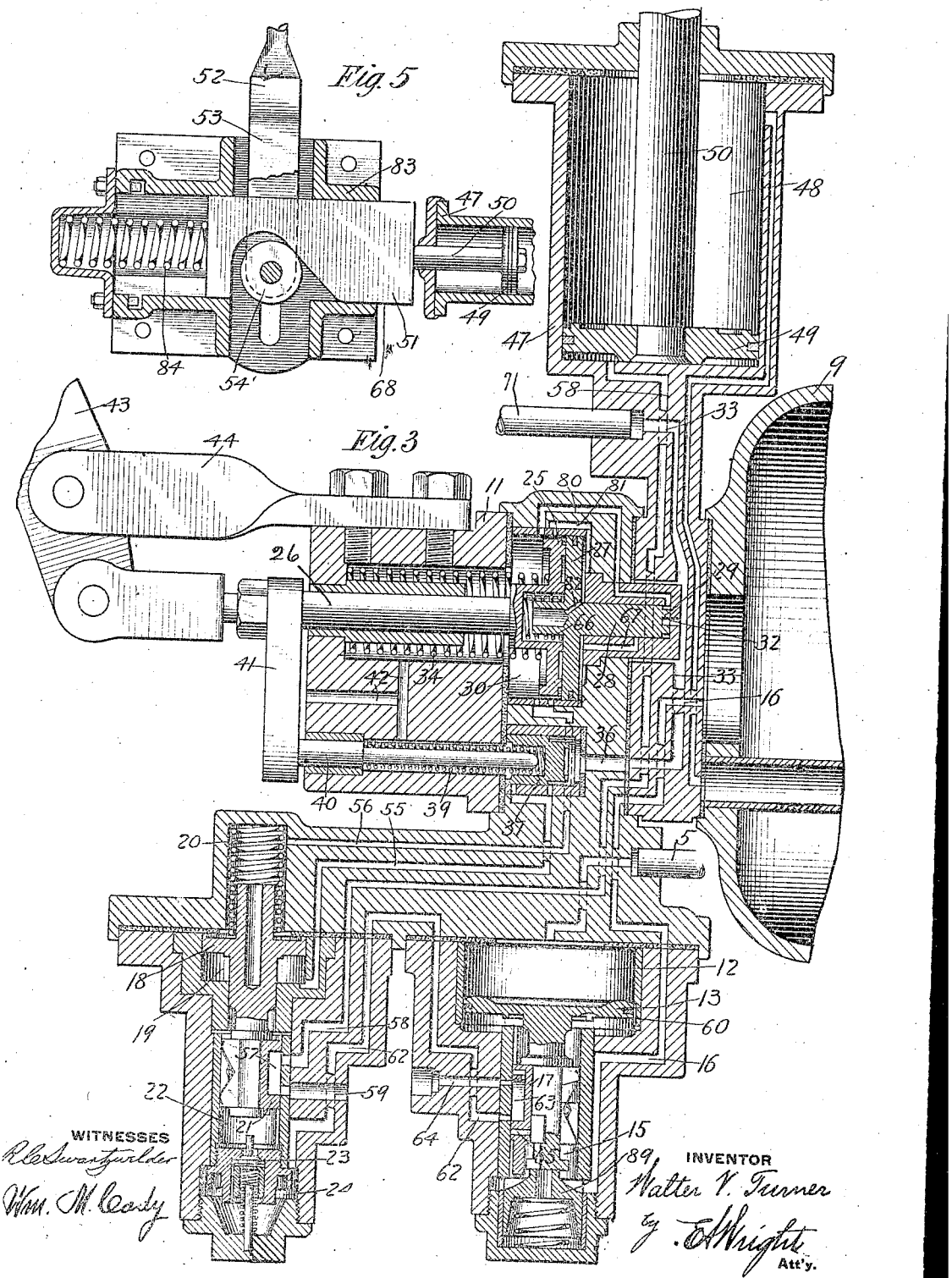

W. V. TURNER.
LOAD BRAKE APPARATUS.
APPLICATION FILED AUG. 27, 1910.
1,053,246.
Patented Feb. 18, 1913.
4 SHEETS—SHEET 4.
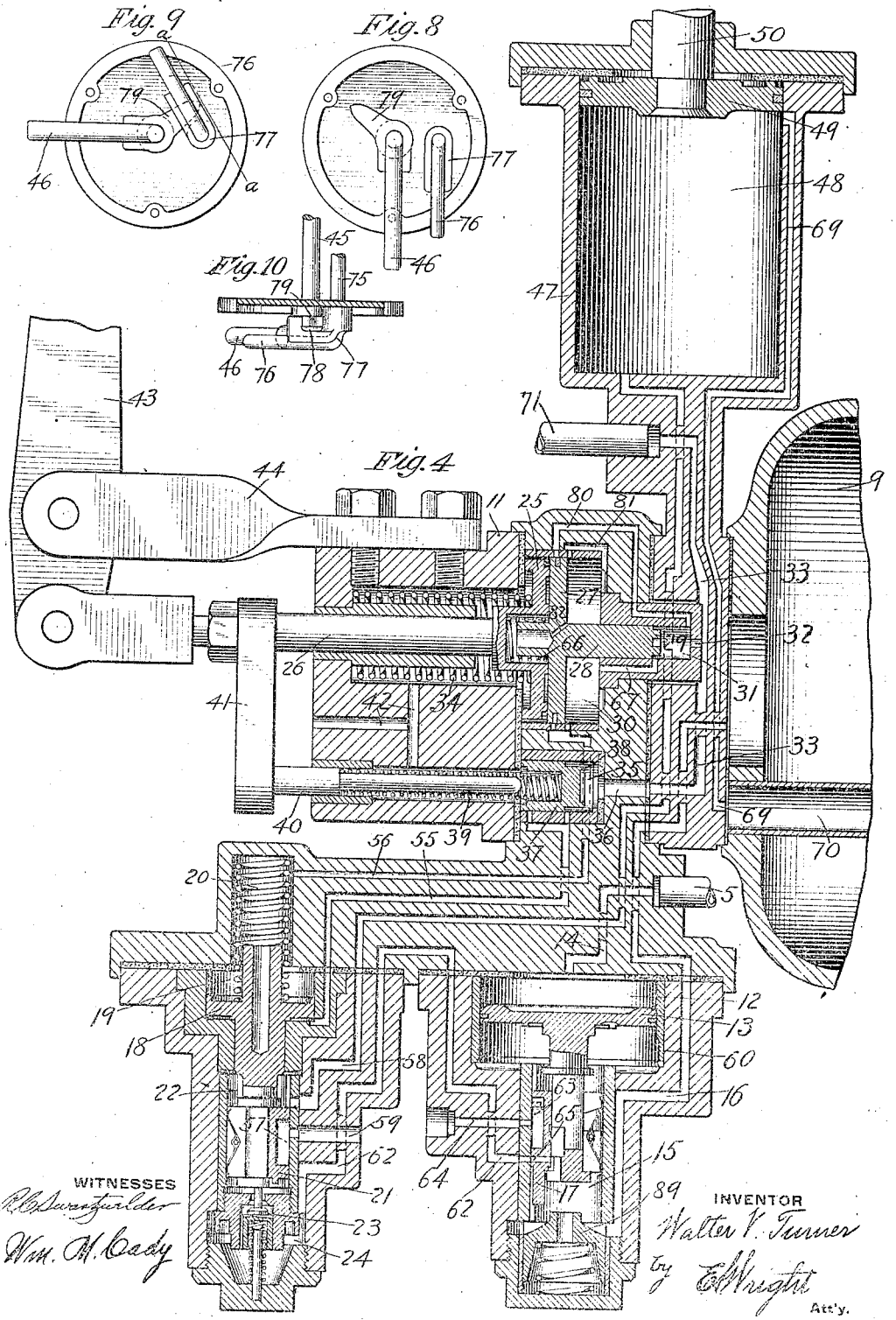

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

LOAD-BRAKE APPARATUS.

1,053,246.  Specification of Letters Patent.  Patented Feb. 18, 1913.

Application filed August 27, 1910. Serial No. 579,296.

*To all whom it may concern:*

Be it known that I, WALTER V. TURNER, a citizen of the United States, residing at Edgewood, in the county of Allegheny and State of Pennsylvania, have invented new and useful Improvements in Load-Brake Apparatus, of which the following is a specification.

This invention relates to fluid pressure brakes, and more particularly to a brake apparatus adapted to provide heavy braking power on loaded cars and light braking power on empty or lightly loaded cars.

The main object of my invention is to provide a generally improved brake apparatus of the above character.

In the accompanying drawings; Figure 1 is an isometric view of an empty and load brake apparatus with my improvements applied thereto; Fig. 2 a sectional diagrammatic view of the controlling valve mechanism for the empty and load brake apparatus, showing the relative positions of the parts when there is little or no air pressure in the brake system; Fig. 3 a similar view, showing the relative positions of the parts when the pressure in the brake system is at or above a certain predetermined degree; Fig. 4 a similar view, showing the relative positions of the parts when set to load position and with the brakes applied in service; Fig. 5 a sectional view in detail of the take up wedge mechanism; Fig. 6 a similar view of a modified form of the take up wedge mechanism; Fig. 7 a central sectional view of the triple valve of the main brake equipment showing the application of one feature of the invention; Fig. 8 a face view of the plate upon which the controlling handle is mounted, showing the handle in light position; Fig. 9 a similar view, showing the parts in load position; and Fig. 10 a section on the line *a—a* of Fig. 9.

As shown diagrammatically in Fig. 1, the empty and load brake apparatus may comprise a main brake equipment for controlling the brakes on empty or lightly loaded cars and a secondary brake equipment which operates with the main brake equipment to provide increased braking power on the loaded cars. The main brake equipment comprises the main brake cylinder 1, the brake cylinder piston rod of which is connected to the brake operating lever 2, auxiliary reservoir 3, and triple valve device 4 connected to the train pipe 5. The secondary brake equipment comprises a brake cylinder 6, the brake cylinder piston rod of which is connected to an auxiliary brake lever 7 having the one end connected by a chain 8 to the brake cylinder piston rod of the main brake cylinder 1, an auxiliary reservoir 9, and an empty and load brake controlling valve mechanism 10 which includes a triple valve portion, connected to the train pipe 5 for controlling the secondary brake equipment.

The controlling valve mechanism 10 is in some respects similar to that disclosed in my prior pending application Serial No. 463,607, filed November 20, 1908, and comprises a casing 11 having a piston chamber 12 connected by passage 14 to the train pipe 5 and containing piston 13 of the triple valve portion, and a valve chamber 15 connected by passage 16 to the auxiliary reservoir 9 and containing a slide valve 17 adapted to be operated by the piston 13. This triple valve portion does not directly control communication to the brake cylinder 6 but depends upon the position of a cut-out valve mechanism comprising a piston 18 contained in a piston chamber 19 and subject on one side to the pressure of a coil spring 20, a slide valve 21 contained in a valve chamber 22, and a puppet valve 23 contained in a valve chamber 24, said valves being operated by the movement of the piston 18.

The operation of the cut-out valve mechanism is controlled by a combined automatic and manually operated valve mechanism consisting of a two part piston having a loose fitting piston head 25 attached to a manually operated rod 26 and a tight fitting piston head 27 provided with a valve stem 28 on the end of which is a seating ring 29. Said piston is contained in a piston chamber 30 and the stem 28 fits within a chamber 31. A port 32 opens into the chamber 31 and leads to a passage 33 which is adapted to be normally supplied with fluid at the pressure carried in the brake system, the seat ring 29 being adapted when seated to expose only a small area of the stem 28 to this pressure, but upon lifting from its seat the full area of the stem is subjected to said pressure. The piston head 25 is subject on one side to the pressure of a heavy coil spring 34 of sufficient tension to return the parts to normal position when the pressure in the brake system falls below a certain predetermined point. The casing 11 is also provided with a small piston chamber 35 having a port 36 opening into the passage 33 and containing a piston 37 having a seat ring 38 adapted when seated to expose only a restricted area of the piston to the pressure of the brake system as supplied through the port 36. The piston 37 is subject on one side to the pressure of a coil spring 39, the tension of which is adapted to be varied by means of a movable abutment carried by a spring rod 40. The rod 40 is attached to an arm 41 carried by the rod 26, so that tension of the spring 39 depends upon the position of the manually operated rod 26. The spring side of the piston head 25 and the piston 37 is constantly open to the atmosphere through an exhaust passage 42.

The rod 26 is pivoted to an operating lever 43 which is pivotally fulcrumed on a bar 44 secured to the casing 11 and said lever is adapted to be operated by means of a rod 45 extending transversely of the car and carrying on each opposite end an operating handle 46.

In order to compensate for differences in the brake leverage between the main and the secondary brake equipments, so that both brake cylinders will be effective upon the same piston travel, a take up mechanism is provided comprising a cylinder casing 47 having a piston chamber 48 containing a piston 49. The piston 49 is provided with a piston rod 50 for operating a wedge block 51. To the brake lever 7 is attached a fulcrum rod 52 having a fork 53 on one end, adapted to inclose the wedge block 51 and carrying a roller 54 adapted to engage the inclined portion of the wedge block 51.

With little or no air pressure in the brake system the parts assume the positions shown in Fig. 2. Assuming the hand lever 46 set to the light position, upon charging the system with fluid under pressure, as soon as the pressure on the piston 37 exceeds the tension of the spring 39, which preferably is adjusted to resist about 60 pounds, said piston is lifted from its seat and the full area of the piston being then exposed to fluid pressure, the piston is thereby rapidly shifted to its outer position, as shown in Fig. 3, in which a passage 55, leading to one side of the piston 18, is opened to passage 36. Fluid under pressure thereupon flows to the chamber at the inner face of the piston 18. In light position, the pistons 25 and 27 are in their outer positions and uncover a passage 56 leading from the spring side of the piston 18 to the piston chamber 30. The spring chamber of the piston is thus open to the atmosphere through the port 42 and the piston 18 is consequently shifted to its outer seat by the fluid pressure in chamber 19, compressing the spring 30. In this position of the piston 18, a cavity 57 in the valve 21 connects a passage 58, leading to the pressure side of the take-up piston 49, with an exhaust port 59, and the valve 23 is closed. Fluid under pressure also flows from the train pipe 5 through the usual feed groove 60 around the triple valve piston 13 and charges the auxiliary reservoir 9 through the passage 16, leading from the valve chamber 15 to the auxiliary reservoir.

The triple valve piston 13 in full release position, as shown in Fig. 3, connects a passage 62, leading from the valve chamber 24, through a cavity 63 in the valve 17, with exhaust port 64.

If it is desired to make an application of the brakes, the train pipe pressure is reduced in the usual manner and air is supplied to the main brake cylinder 1 by the operation of the triple valve 4. The triple valve piston 13 may also move to application position through the reduction in train pipe pressure, but fluid supplied to the passage 62 through the service port 65 of the valve 17 cannot flow to the brake cylinder 6 because the valve 23 is closed. Thus on the lightly loaded or empty cars only the braking power due to the main brake cylinder is obtained.

On the loaded cars the handle 46 is adjusted to the load position, as shown in Fig. 9, and the rod 26 is operated by the lever 43 to shift the piston 25 to the position shown in Fig. 4. Between the piston heads 25 and 27 is interposed a spring 66 which is adapted, when the piston head 25 is in load position, to resist a certain degree of pressure on the small area of the stem 28 which is exposed in the seated position to the pressure supplied to port 32, preferably about 20 pounds. Thus if the pressure in the system is more than 20 pounds, the resistance of the spring is overcome and the stem 28 is lifted from its seat exposing the full area of said stem to fluid under pressure. This pressure is sufficient to rapidly shift the piston head 27 to the position shown in Fig. 4. In this position communication is opened through a port 67 from the chamber 31 to the chamber 30 and the fluid thus admitted to the piston head 27 operates to securely maintain the same in its load position. The passage 56 is cut off from the atmosphere by the piston head 27 in this position and fluid is supplied thereto from the piston chamber 30, thus permitting the fluid pressures to equalize on opposite sides of the piston 18. With the pressures equalized, the spring 20 operates to shift the piston 18 to the position shown, in which the passage 58 is opened to the valve chamber 22 and the valve 23 is lifted from its seat. If an application of the brakes is now made, with the parts in load position, the triple valve piston 13 moving to application position connects the port 65 with the passage 62 so that fluid is supplied from the auxiliary reservoir 9 to valve chamber 24 and thence flows to valve chamber 22 and through passage 58 to the take-up piston chamber 48. The piston 49 is thereupon shifted outwardly, and operates the wedge block 51, which in turn causes the roller 54 to ride up on the wedge incline and thereby pull out the rod 52. The brake lever 7 of the secondary brake cylinder 6 is thus shifted to compensate for differences in leverage between the lever 2 of the main brake cylinder and the lever 7. Also, if desired, this take-up mechanism may be arranged to take up slack due to the initial movement of the main brake cylinder piston.

When the piston 49 has moved out to the limit of its travel, the roller 54 engages on the surface 68 of the wedge block and the rod 52 is thereby prevented from moving back. In the outer position of piston 49, a passage 69, leading to the brake cylinder passage 70, is opened to the piston chamber 48, so that fluid pressure may flow to the brake cylinder 6. It will now be seen that when the apparatus is adjusted to the load position both the main and the secondary brake cylinders are supplied with fluid under pressure in making an application of the brakes, so that heavy braking power is obtained. The brake cylinder pressures may be increased in both brake cylinders in the usual manner, by making further reductions in train pipe pressure, as will be evident.

Provision is made for automatically adjusting the apparatus on all cars to light or empty position when the pressure is raised to a predetermined point from the condition of no pressure in the system, whether the apparatus was previously adjusted to load or empty position, as when all or nearly all the air is out of the system, the heavy spring 34 has sufficient strength to return the piston heads 25 and 27 and the other connected parts to light position and the piston 37 is also returned to its seat. Upon increasing the pressure in the system to 60 pounds or a little above the tension of the spring 39, the piston 37 is shifted to open position on all the cars of the train and this causes the movement of the piston 18 and the valves 21 and 23 to the position for light braking. It will thus be seen that regardless of whether the load brake apparatus is set to load or empty position, when the air goes out of the system the parts on all the cars are adjusted to the same position and thus when air pressure is again supplied to the system, at a predetermined degree of pressure, the apparatus on each car is automatically adjusted to light load position.

By reason of the larger area of the piston 37 exposed to fluid pressure when away from its seat, the pressure at which the spring 39 can return the piston to its seat is less than the pressure required to lift the piston from its seat and also the resistance of the spring 39 is greater in the empty position of the parts than in the load position. Thus when the parts are adjusted to the light or empty position the piston 37 may lift from its seat at 60 pounds while requiring the pressure to fall to 40 pounds before closing. When the parts are set for load, the spring 39 is elongated and the fluid pressure required to hold the piston 37 open is reduced to say 20 pounds. The purpose of the above will be evident from the following considerations: Should the pressure of the system fall below 40 pounds by leakage or after making several successive applications of the brakes, no further increase in braking power could be obtained in the ordinary manner, but with this construction, the piston 37 seats at 40 pounds and thereby opens the side of piston 18 opposite the spring to the atmosphere through passage 55 and exhaust port 42. Both sides of the piston 18 are therefore at atmospheric pressure, thus permitting the spring 20 to shift the piston 18 to the load position, and the piston 13 and valve 17 having previously been shifted to application position, air is admitted to the secondary brake cylinder from the auxiliary reservoir 9, and an increased braking power is provided at a time when such increase is likely to be very desirable. On the other hand, if the parts are adjusted to load position, the reduced tension of the spring 39 requires that the fluid pressure reduce to say 20 pounds before the piston 37 will be returned to its seat, so that in the case of loaded cars, ordinary reductions in train pipe pressure or where the drop in train pipe pressure is only temporary, will not operate to adjust the parts to light position, when the train pipe pressure is again restored.

While the fluid pressure supplied to the passage 33 may be taken directly from the train pipe, I prefer to provide a pipe 71 connected to passage 33 and leading to the piston chamber of the triple valve for the main brake cylinder. As shown in Fig. 7, this pipe 71 communicates with a passage 72 which opens to the piston chamber 73 at a point such that normally the passage is open directly to the train pipe, but when the triple valve piston 74 is in emergency position, said passage is open to the auxiliary reservoir side of the piston. This prevents temporary or sudden reductions in train pipe pressure from operating to effect the adjustment of the apparatus on the loaded cars to light position, as upon such reductions in train pipe pressure the triple valve piston moves to emergency position and the pressure to the passage 33 is supplied from the auxiliary reservoir; and it is not until the pressure in the auxiliary reservoir falls below the predetermined degree that the light and load apparatus is effected.

As shown in Figs. 8 to 10 inclusive, a locking device may be provided for the operating handle 46 for locking the same in load position, comprising a rod 75 having a bent handle 76 on each end and provided with a locking member 77 having a notch 78. The handle 46 carries a projecting finger 79 adapted to fit into the notch 78. When the handle is turned to load position, shown in Fig. 9, the bent handle 76 is turned so that the notch 78 passes over the finger 79 thereby locking the handle 76 and preventing its movement. It is sometimes desirable to lock the handle 46 and the connected parts, as where a loaded car is set off on a side track temporarily and is not unloaded, and it is desired to prevent the load brake apparatus from going to light position when fluid pressure is again supplied to the car.

A port 80 connects the end of the piston stem 28 with the atmospheric side of piston head 25 when the parts are in light position so as to permit the escape of any fluid which may leak past the seat 29 from the port 32. A port 81 is also provided to connect the stem side of the piston 27 with the atmosphere and similarly permits the escape of fluid which may leak thereto.

The provision of the two piston heads 25 and 27, is for the purpose of securing the positive action of the parts, in the following manner: If the piston head 25 is retracted by the action of the handle 46 to load position, the movement of the piston head 27 will be dependent on the opposing pressures of the spring 66, and the fluid pressure acting on the exposed area of the stem 28 and the spring 66 being adapted to resist say 20 pounds pressure on said exposed area, the piston will not be shifted unless the pressure in the brake system exceeds 20 pounds, and if the pressure is less than 20 pounds, as soon as the handle 46 is released, the spring 34 will return the parts to light position, but if the pressure is above 20 pounds, the piston 27 is shifted over and the air pressure of the system enters port 67 and operates on piston 27 to maintain same in the load position against the resistance of the spring 34.

If the pressure of the system acting on the piston 27 falls suddenly, the same is prevented from moving violently to its seat because as soon as the port 67 is closed by the stem 28, the air in chamber 30 is confined and acts as a dash pot, a port 82 through the piston being provided to permit the gradual relief of air pressure in said chamber.

In the take-up wedge mechanism shown in Fig. 5, the wedge block 51 is firmly held against the thrust of the brake levers by means of a heavy casing 83 and a coil spring 84 is employed to effect the release of the parts when the air pressure is released from the cylinder 48. Another means for releasing the wedge mechanism is shown in Fig. 6 and comprises a fluid pressure operated piston 85 having a piston stem 86 adapted to act on the wedge block 51.

Air is supplied to the piston 85 through a pipe 87 which is preferably connected to the exhaust port of the triple valve 4, so that when the brakes are released on the loaded cars where the wedge block has been shoved out, air pressure from the brake cylinder 1 acts on the piston 85 and shifts the same with the wedge block to release position. An exhaust port 88 is then opened by the piston 85, to permit the exhaust of air from the main brake cylinder 1.

While not essential to the operation of the invention, the triple valve device employed is shown as of the retarded release type having a yielding resistance device 89 for resisting the movement of the triple valve from normal full release position to a position in which the release is restricted or closed.

Having now described my invention, what I claim as new and desire to secure by Letters Patent, is:—

1. In a load brake apparatus, the combination with a main brake mechanism for effecting an application of the brakes, of a secondary brake mechanism for applying the brakes with increased power, a device for taking up slack caused by the movement of the main brake mechanism, a piston operated by fluid under pressure for actuating said device, and means for cutting the secondary brake mechanism into operation.

2. In a load brake apparatus, the combination with a main brake mechanism operating upon a reduction in train pipe pressure for effecting an application of the brakes, of a secondary brake mechanism operating upon a reduction in train pipe pressure for applying the brakes with increased power, means for cutting said secondary brake mechanism into and out of action, and means operating a take-up mechanism, and a piston operated by fluid under pressure to actuate said mechanism upon applying the brakes with the secondary brake mechanism cut in, to take up slack produced by the movement of the main brake mechanism.

3. In a load brake apparatus, the combination with a main automatic brake mechanism operated by variations in train pipe pressure for applying the brakes, of a secondary automatic brake mechanism operated by variations in train pipe pressure for applying the brakes with increased power, means for cutting said secondary brake mechanism into and out of action, and means for taking up slack produced by the movement of the main brake mechanism prior to movement of the secondary brake mechanism upon applying the brakes with the secondary brake mechanism cut in.

4. In an empty and load brake apparatus, the combination with a valve mechanism governed by the pressure in the brake system for automatically adjusting said apparatus for empty or for load braking, of means for normally supplying said pressure of the brake system from the train pipe and operating upon an emergency application of the brakes to supply said pressure from the auxiliary reservoir.

5. In a light and load brake apparatus, the combination with a train pipe, triple valve, auxiliary reservoir, and brake cylinder, of a valve mechanism governed by fluid under pressure supplied from the brake system for automatically adjusting said apparatus to light or load braking, and means for normally supplying air to said valve mechanism from the train pipe and adapted upon an emergency application to supply air to said valve mechanism from the auxiliary reservoir.

6. In a light and load brake apparatus, the combination with a main brake cylinder, a train pipe, auxiliary reservoir, and triple valve, of a secondary brake cylinder, auxiliary reservoir, and triple valve, and means for cutting off communication from the secondary triple valve to the secondary brake cylinder in light braking.

7. In a light and load brake apparatus, the combination with valve means for connecting up the apparatus for light or load braking, of a piston device subject to the opposing pressures of a spring and the pressure of the brake system for controlling said valve means and means for effecting the positive movement of said piston device.

8. In a light and load brake controlling mechanism, the combination with a manually operated mechanism for adjusting the mechanism for light or for load braking, of a piston subject to the pressure of the brake system and adapted to move with said manually operated mechanism only at a predetermined degree of pressure in the brake system.

9. In a light and load brake controlling mechanism, the combination with a manually operated piston head subject on one side to the pressure of a spring, of a controlling piston subject on one side to the pressure of the brake system, valve means governed by the movement of said controlling piston for effecting the adjustment of the controlling mechanism for light and load braking, said controlling piston being adapted to move with said manually operated head at a predetermined degree of pressure in the brake system.

10. In a light and load brake controlling mechanism, the combination with valve means for effecting the adjustment of said controlling mechanism for light or load braking, a piston subject on one side to the pressure of the brake system and on the opposite side to the pressure of a spring for controlling the operation of said valve means, a manually operated mechanism for maintaining said piston in light load position and adapted upon movement to load position to permit the movement of said piston when the pressure of the brake system acting on the piston exceeds the pressure of said spring.

11. In a light and load brake apparatus, the combination with a main brake mechanism for effecting an application of the brakes, of a secondary brake mechanism for applying the brakes with increased power comprising a secondary brake cylinder, a triple valve, auxiliary reservoir, and train pipe, and valve means operated by fluid under pressure for controlling communication from said triple valve to said secondary brake cylinder.

12. In a light and load brake apparatus, the combination with a main brake cylinder and piston and a secondary brake cylinder and piston for applying the brakes with increased power, of a take-up cylinder and piston and means operated by said take-up piston for taking up slack due to the movement of the main brake piston.

13. In a light and load brake apparatus, the combination with a main brake cylinder and piston and a secondary brake cylinder and piston for applying the brakes with increased power, of a take-up cylinder and piston and a wedge mechanism operated by said take-up piston for taking up slack due to the movement of the main brake piston.

14. In a light and load brake apparatus, the combination with a main brake cylinder and piston and a secondary brake cylinder and piston for applying the brakes with increased power, of a take-up cylinder and piston, means operated by said take-up piston for taking up slack due to the movement of the main brake piston, and a second fluid pressure operated piston for effecting the release of said means.

15. In a light and load brake apparatus, the combination with a main brake cylinder and piston and a secondary brake cylinder and piston for applying the brakes with increased power, of a take-up cylinder and piston, means operated by said take-up piston for taking up slack due to the movement of the main brake piston, and a piston device operated by the exhaust air from the main brake cylinder in releasing the brakes for effecting the release movement of said means.

16. In a light and load brake apparatus, the combination with mechanism for adjusting the apparatus for light and load braking, of a manually operated handle for controlling said mechanism and a manually operated lever for locking said handle in the load position.

17. In a light and load brake apparatus, the combination with mechanism for adjusting the apparatus for light and load braking, of a manually operated handle for controlling said mechanism and a separate manually operated lever for locking said handle in the load position.

18. In a light and load brake apparatus, the combination with a train pipe, triple valve, auxiliary reservoir, and brake cylinder, of a valve mechanism governed by fluid under pressure supplied from the brake system for automatically adjusting said apparatus to light or load braking, and means for normally supplying air to said valve mechanism from the train pipe and adapted upon movement of the triple valve beyond service application position to supply air from the auxiliary reservoir to said valve mechanism.

In testimony whereof I have hereunto set my hand.

WALTER V. TURNER.

Witnesses:
  WM. M. CADY,
  A. M. CLEMENTS.